United States Patent
Mandali et al.

(10) Patent No.: US 10,803,731 B2
(45) Date of Patent: Oct. 13, 2020

(54) DYNAMIC SELECTION OF A DEVICE FROM A COMMUNITY OF DEVICES AS A CONDUIT FOR LOCATION DETECTION MODE ACTIVATION

(71) Applicant: Capital One Services, LLC, McLean, VA (US)

(72) Inventors: Venkata Mandali, Glen Allen, VA (US); Arunkumar Natarajan, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 123 days.

(21) Appl. No.: 16/113,747

(22) Filed: Aug. 27, 2018

(65) Prior Publication Data

US 2019/0279486 A1 Sep. 12, 2019

Related U.S. Application Data

(63) Continuation of application No. 15/914,470, filed on Mar. 7, 2018, now Pat. No. 10,062,263.

(51) Int. Cl.
*G08B 21/24* (2006.01)
*G08B 25/00* (2006.01)
(Continued)

(52) U.S. Cl.
CPC ........... *G08B 21/24* (2013.01); *G08B 25/005* (2013.01); *G08B 25/12* (2013.01); *H04W 4/80* (2018.02);
(Continued)

(58) Field of Classification Search
CPC ...... G08B 21/24; G08B 25/005; G08B 25/12; G08B 25/009; H04W 4/80; H04W 4/029; H04W 4/20
(Continued)

(56) References Cited

U.S. PATENT DOCUMENTS

| 7,006,846 | B2 * | 2/2006 | Stratmoen | G06K 7/0008 455/558 |
|---|---|---|---|---|
| 7,724,137 | B2 * | 5/2010 | Page | G06K 19/0723 340/572.1 |

(Continued)

OTHER PUBLICATIONS

Stacksocial, "The Find'Em Tracking Card: The World's Smallest Loss Prevention Device", https://stacksocial.com/sales/track-your-valuables-at-all-times-with-the-find-em-tracking-card, Jan. 21, 2014, 9 pages.

(Continued)

*Primary Examiner* — John A Tweel, Jr.
(74) *Attorney, Agent, or Firm* — Harrity & Harrity, LLP (57) ABSTRACT

A first device may determine to activate a location detection mode of a second device. The location detection mode may be related to locating the second device. The second device may not be within a short-range communicative proximity of a wireless transceiver component of the first device. The first device may select a user device, of a plurality of user devices, via which to cause the second device to activate the location detection mode. The first device may provide, via the user device, a set of instructions to cause the second device to activate the location detection mode. The first device may perform one or more other actions related to locating the second device after providing the set of instructions.

20 Claims, 6 Drawing Sheets

(51) Int. Cl.
*H04W 4/80* (2018.01)
*G08B 25/12* (2006.01)
*H04W 4/029* (2018.01)
*H04W 4/20* (2018.01)

(52) U.S. Cl.
CPC .......... *G08B 25/009* (2013.01); *H04W 4/029* (2018.02); *H04W 4/20* (2013.01)

(58) Field of Classification Search
USPC ...................................................... 340/686.6
See application file for complete search history.

(56) References Cited

U.S. PATENT DOCUMENTS

| | | | |
|---|---|---|---|
| 8,212,675 B2* | 7/2012 | Page | G06K 19/0723 |
| | | | 340/572.1 |
| 9,357,348 B2 | 5/2016 | Evans et al. | |
| 9,961,489 B2* | 5/2018 | Elias | G07C 9/28 |
| 10,062,263 B1* | 8/2018 | Mandali | G08B 25/005 |
| 10,217,105 B1* | 2/2019 | Sangi | H04W 4/80 |
| 10,410,206 B2* | 9/2019 | Sangi | H04B 17/318 |
| 2003/0182194 A1 | 9/2003 | Choey et al. | |
| 2005/0148339 A1 | 7/2005 | Boman | |
| 2006/0232398 A1* | 10/2006 | Nedblake | G08B 13/1427 |
| | | | 340/539.13 |
| 2007/0120698 A1 | 5/2007 | Turk | |
| 2008/0079581 A1* | 4/2008 | Price | G06Q 10/08 |
| | | | 340/572.1 |
| 2012/0290449 A1* | 11/2012 | Mullen | G06Q 10/00 |
| | | | 705/27.2 |
| 2012/0322380 A1 | 12/2012 | Nannarone | |
| 2015/0372746 A1 | 12/2015 | Xie | |
| 2016/0189507 A1 | 6/2016 | Rayner | |
| 2016/0335876 A1 | 11/2016 | Verma | |
| 2019/0385147 A1* | 12/2019 | Sangi | H04W 4/023 |

OTHER PUBLICATIONS

CBS News, "Visa app will track your location to prevent credit card fraud" https://www.cbsnews.com/news/visa-app-will-track-your-location-to-prevent-credit-card-fraud/, Feb. 16, 2015, 4 pages.

Tile, "How Tile finds", https://www.thetileapp.com/en-us/how-it-works, Aug. 31, 2016, 9 pages.

Tile "Use Tile to Ring your Phone" https://support.thetileapp.com/hc/en-us/articles/207274527-Use-Tile-to-Ring-your-Phone, May 10, 2017, 2 pages.

Tile, "How Community Find Works", https://www.thetileapp.com/en-us/blog/how-community-find-works, Nov. 3, 2017, 4 pages.

* cited by examiner

DYNAMIC SELECTION OF A DEVICE FROM A COMMUNITY OF DEVICES AS A CONDUIT FOR LOCATION DETECTION MODE ACTIVATION

RELATED APPLICATION

This application is a continuation of U.S. patent application Ser. No. 15/914,470, filed Mar. 7, 2018 (now U.S. Pat. No. 10,062,263), which is incorporated herein by reference.

BACKGROUND

A global positioning tracking unit is a device that uses the global positioning system (GPS) to determine and track the location of the tracking unit at intervals. Recorded location data can be stored within the tracking unit, or may be transmitted to another device. In some cases, the tracking unit's location may be displayed on a digital map either in real time or when analyzing the location data later.

SUMMARY

According to some possible implementations, a method may include determining, by one or more processors of a transaction card, to activate a location detection mode of a first user device. The location detection mode may be related to locating the first user device. The first user device may not be within a short-range communicative proximity of a wireless transceiver component of the transaction card. The method may include selecting, by the one or more processors, a second user device, of a plurality of user devices, via which to cause the first user device to activate the location detection mode. The plurality of user devices may be within the short-range communicative proximity of the wireless transceiver component of the transaction card. The method may include providing, by the one or more processors and via the second user device, a set of instructions to cause the first user device to activate the location detection mode. The method may include performing, by the one or more processors, one or more other actions related to locating the first user device after providing the set of instructions. The one or more other actions may include outputting sensory output associated with indicating that the first user device has been located, or monitoring for a pairing between the transaction card and the first user device.

According to some possible implementations, a server device may include one or more memories; and one or more processors, communicatively coupled to the one or more memories, configured to determine to activate a location detection mode of a device. The location detection mode may be related to locating the device. The one or more processors may be configured to identify a plurality of user devices via which a set of instructions can be provided. The set of instructions may be related to causing the device to activate the location detection mode. The one or more processors may be configured to select a user device, of the plurality of user devices, via which to provide the set of instructions. The user device may be within a short-range communicative proximity of a wireless transceiver component of the device. The one or more processors may be configured to provide, via the user device, the set of instructions to cause the device to activate the location detection mode. The one or more processors may be configured to perform one or more other actions related to locating the device after providing the set of instructions.

According to some possible implementations, a non-transitory computer-readable medium may store one or more instructions that, when executed by one or more processors, cause the one or more processors to determine to activate a location detection mode of a device. The location detection mode may be related to locating the device. The device may not be within a short-range communicative proximity of a wireless transceiver component of another device. The one or more instructions, when executed by the one or more processors, may cause the one or more processors to select a user device, of a plurality of user devices, via which to cause the device to activate the location detection mode. The one or more instructions, when executed by the one or more processors, may cause the one or more processors to provide, via the user device, a set of instructions to cause the device to activate the location detection mode. The one or more instructions, when executed by the one or more processors, may cause the one or more processors to perform one or more other actions related to locating the device after providing the set of instructions.

DETAILED DESCRIPTION

The following detailed description of example implementations refers to the accompanying drawings. The same reference numbers in different drawings may identify the same or similar elements.

Location tags may be used to locate a lost, stolen, or misplaced item. For example, an individual may use a user device to determine an approximate location of a location tag attached to a set of keys by determining whether the location tag is within communicative proximity of a Bluetooth transceiver of the user device. While this technique can facilitate locating the item, the accuracy of locating the item may be reduced by interference between the user device and the location tag and/or by a lack of precise geolocation information for the location tag. In addition, this technique may only be effective if the location tag is within communicative proximity (e.g., a short-range direct communication, a range for Bluetooth communications, etc.) of the user device, thereby reducing an effectiveness of this technique.

Some implementations described herein provide a first device that is capable of identifying second devices that are in communicative proximity of a third device to be located, selecting one of the second devices, and activating a location detection mode of the third device so that the third device can be accurately located via use of geolocation information. In this way, the first device facilitates location of a lost, stolen, or misplaced third device when the lost, stolen, or misplaced third device is not within communicative proximity of the first device. This increases an accuracy of locating the lost, stolen, or misplaced third device via use of a more accurate technique for locating the lost, stolen, or misplaced third device. In addition, this conserves processing resources of the second devices that are to be used as conduits for locating the third device via dynamic selection of a second device to be used to assist with locating the lost, stolen, or misplaced third device, such that an optimal second device is selected. Further, this reduces an amount of time needed to locate a lost, stolen, or misplaced third device, thereby improving an efficiency of locating the lost, stolen, or misplaced third device.

Figure 1:
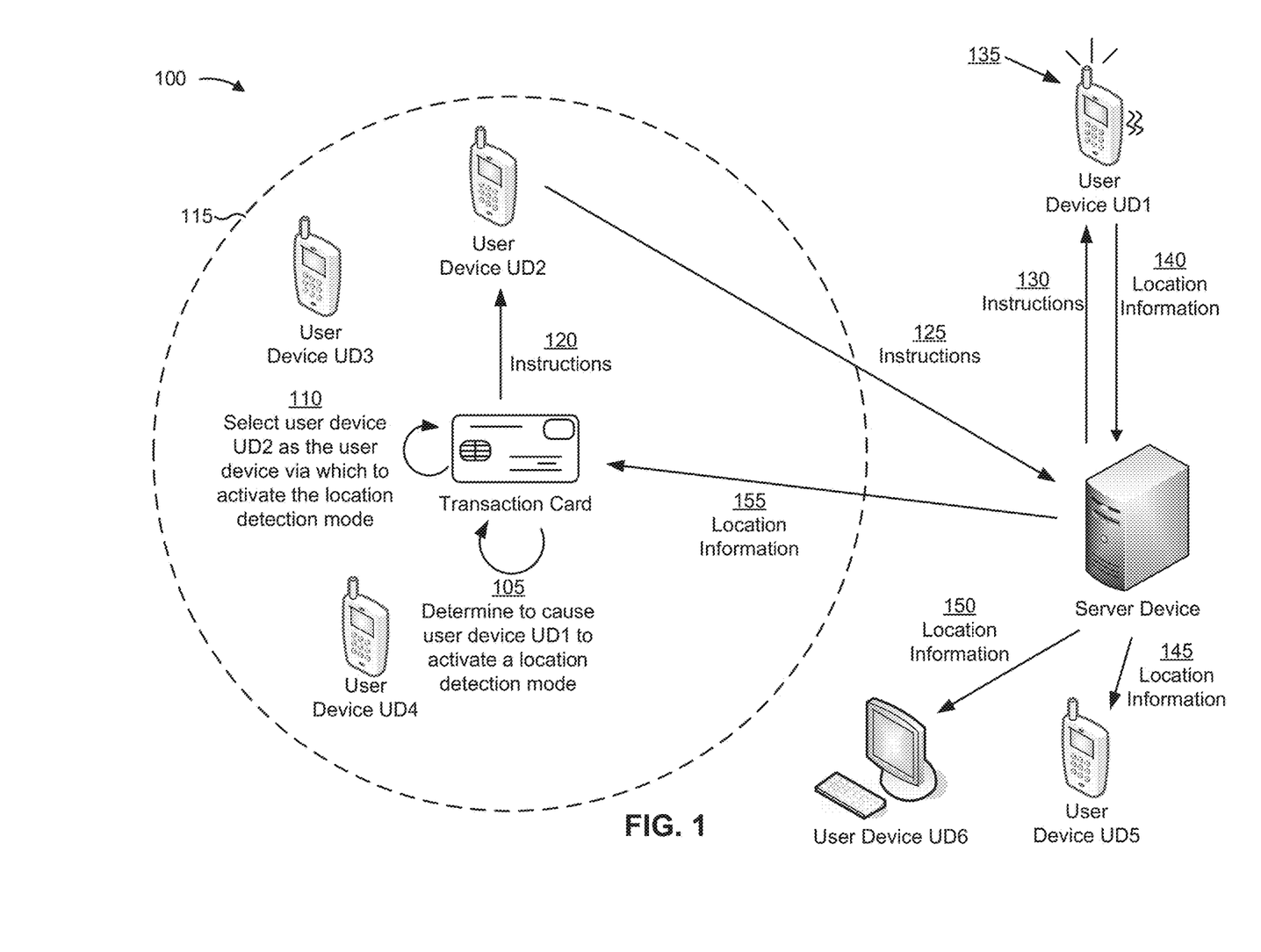
FIG. 1 is a diagram of an overview of an example implementation described herein.

FIG. 1 is a diagram of an overview of an example implementation 100 described herein. As shown in FIG. 1, implementation 100 includes multiple user devices (shown as user devices UD1 through UD6), a transaction card, and a server device. FIG. 1 shows an example of using a transaction card to locate a user device (e.g., user device UD1), such as when user device UD1 is lost, stolen, or misplaced.

As shown by reference number 105, the transaction card may determine to cause user device UD1 to activate a location detection mode. For example, the transaction card may determine to cause user device UD1 to activate a location detection mode related to locating user device UD1. In some implementations, when a location detection mode is activated, user device UD1 may output sensory output, may determine and/or output location information, and/or the like. In some implementations, the transaction card may include processing and/or communication functionalities to perform some of the functions described herein.

In some implementations, the transaction card may have been paired with user device UD1 via a wireless connection. For example, the transaction card and user device UD1 may have been paired via a Bluetooth connection, a near-field communication (NFC) connection, such as when the transaction card is in a card holder mounted on the user device UD1, and/or the like. In some implementations, the transaction card may determine to cause user device UD1 to activate a location detection mode based on detecting that the transaction card and user device UD1 are no longer paired.

Additionally, or alternatively, the transaction card may determine to cause user device UD1 to activate a location detection mode based on input to the transaction card. For example, the transaction card may be configured with an input component, such as a button, and a user of the transaction card may select the input component to cause the transaction card (e.g., one or more processors, microprocessors, controllers, etc. of the transaction card) to determine to cause user device UD1 to activate a location detection mode.

In some implementations, the transaction card may identify a particular user device (e.g., user device UD1) for which the location detection mode is to be activated based on information stored in memory resources of the transaction card that identifies one or more user devices with which the transaction card is associated. For example, if the transaction card is associated with a single user device, the transaction card may identify the single user device as the particular user device for which a location detection mode is to be activated.

Conversely, if the transaction card is associated with multiple user devices, such as when there are multiple authorized users of the transaction card, the transaction card may need input to identify the particular user device for which a location detection mode is to be activated. For example, a user of the transaction card may use an input component of the transaction card to identify which of the multiple user devices is to have a location detection mode activated. Additionally, or alternatively, and as another example, an individual may provide input, via another user device, that identifies a particular user device for which a location detection mode is to be activated. Continuing with the previous example, the individual may log into an account associated with the transaction card via the other user device and may select, via a user interface, the particular user device for which a location detection mode is to be activated. In this case, the other user device may provide information identifying the particular user device to the server device, which may provide the information to the transaction card (e.g., when the transaction card is communicatively coupled to a transaction terminal). Additionally, or alternatively, the other user device may provide the information directly to the transaction card when the transaction card is communicatively coupled to the other user device.

Additionally, or alternatively, the transaction card may identify a particular user device, of multiple user devices, by identifying the most recently paired user device that is no longer paired with the transaction card (e.g., using a data structure that includes a log of user devices that were paired with the transaction card, timestamps for when the user devices were paired with the transaction card, and/or the like stored in memory resources of the transaction card). Additionally, or alternatively, the transaction card may identify a particular user device, of multiple user devices, by identifying a user device for which a connection was terminated without receiving a notification from the user device indicating that the connection is being terminated. For example, a user device may provide a notification to the transaction card when a wireless connection between the user device and the transaction card is intentionally terminated and may not provide the notification when the user device and the transaction card become unpaired unintentionally, such as a result of being taken out of communicative range of each other.

In some implementations, the transaction card and/or user device UD1 can be configured such that this functionality is turned off or disabled (e.g., via a paired user device for the transaction card, via an input component associated with the transaction card and/or user device UD1, etc.). This conserves processing resources that would otherwise be consumed determining to cause user device UD1 to activate a location detection mode.

As shown by reference number 110, the transaction card may select user device UD2 as the user device via which to activate the location detection mode (e.g., from among multiple user devices within communicative proximity of the transaction card). For example, and as shown by reference number 115, the transaction card may have a limited range for communications (e.g., a few inches to a few hundred feet) based on being configured with a Bluetooth transceiver, an NFC antenna, and/or another short-range communication component. As such, if user device UD1, for which a location is to be determined, is out of range of the transaction card (as is the case with user device UD1), then the transaction card may need to communicate via one or more other devices (e.g., another user device, the server device, etc.) that are capable of longer-range communications. For example, and as is described elsewhere herein, the transaction card may use user device UD2 to communicate with the server device and with user device UD1 via a cellular network, the Internet, and/or the like.

Continuing with the previous example, the transaction card may need to communicate via user device UD2 (e.g., rather than using user device UD2 to locate user device UD1) because user device UD2 may be associated with an individual that the user of the transaction card does not know (e.g., a passerby, an individual in the same public place as the user of the transaction card, etc.) and as a result, the user of the transaction card may not have access to user device UD2 to locate user device UD1. Additionally, or alternatively, the transaction card may need to communicate with user device UD2 in the manner described herein as the transaction card may store information that identifies user device UD1 and/or that is needed to activate the location detection mode (e.g., an identifier that identifies user device UD1, a security token, etc.), which user device UD2 may not have access to. Additionally, or alternatively, the transaction card may communicate with user device UD2 to conserve processing resources of the transaction card (e.g., the transaction card may use a location of user device UD2 as a proxy location for the location of the transaction card, thereby reducing or eliminating a need for the transaction card to use a GPS component of the transaction card to determine the location of the transaction card).

In this way, the transaction card can activate a location detection mode of user device UD1 when the transaction card and user device UD1 are out of range of each other (e.g., out of NFC range, out of Bluetooth range, etc.).

In some implementations, the transaction card may select user device UD2 based on information associated with one or more factors. For example, the one or more factors may include whether user device UD2 has opted in to having user device UD2 be used for such a service, whether user device UD2 is on a list of trusted user devices (e.g., based on being associated with the user of user device UD1, based on being associated with a family member of the user of user device UD1, based on being associated with an employee of the same organization as the user of user device UD1, etc.), a preference of a user of user device UD2 (e.g., a preference related to when user device UD2 can be used as a conduit for locating user device UD1), a network provider associated with user device UD2 (e.g., the transaction card may select user device UD2 based on being associated with the same network provider as user device UD1 or a partner of the network provider of user device UD1), whether user device UD2 has a particular application installed (e.g., associated with a particular vendor, service, etc.), and/or the like.

Additionally, or alternatively, the one or more factors may include an amount of computing and/or processing resources currently being used by user device UD2 (e.g., the transaction card may avoid selecting a user device that may become overloaded if used for this service), a data plan associated with user device UD2 (e.g., a user device associated with an unlimited data plan may be preferred to a user device that is not associated with an unlimited data plan), an amount of data remaining on a data plan for a time period (e.g., a user device that has one gigabyte (GB) of data remaining on the current month's data plan relative to another user device that has 0.5 GB of data remaining on the current month's data plan), a signal strength of a wireless signal received from user device UD2 relative to a threshold and/or relative to other user devices within communicative proximity of the transaction card (e.g., a user device associated with a stronger signal strength may be preferred), and/or the like.

In some implementations, the transaction card may receive the information related to the one or more factors based on requesting the information. For example, the transaction card may send a request for the information and/or an instruction to provide the information to any user device within communicative proximity of the transaction card (e.g., to user devices UD2, UD3, and UD4), and may receive the information based on sending the request or the instruction.

Additionally, or alternatively, the transaction card may send an instruction to any of the user devices in communicative proximity of the transaction card to cause the user devices to provide a user interface for display. For example, the user interface may facilitate input of the information related to the one or more factors by users of the user devices, may request opt-in for allowing the transaction card to use the user devices to communicate with user device UD1, and/or the like. Additionally, or alternatively, the information related to the one or more factors may be information user devices broadcast normally and the transaction card may monitor this information automatically when the transaction card becomes unpaired from a user device (e.g., from user device UD1).

In some implementations, the transaction card may determine respective scores for the possible user devices that could be used to communicate with user device UD1 (e.g., user devices within communicative proximity of the transaction card, such as user devices UD2, UD3, and UD4) and may select user device UD2 based on the respective scores for the possible user devices. In some implementations, the transaction card may determine a respective score based on information for the one or more factors having a particular value (e.g., an affirmative indication to an opt-in request), satisfying a threshold, being within a range of values, and/or the like.

In some implementations, a score (e.g., a respective score) may be based on individual respective scores for the one or more factors. For example, the score may be an average of the individual scores, a weighted score where the individual scores for different factors are weighted differently, output of a function applied to the individual scores, and/or the like. In some implementations, the transaction card may select user device UD2 based on a score for user device UD2 satisfying a threshold, being within a range of scores, being the highest or lowest score relative to scores for other user devices, and/or the like.

As shown by reference number 120, the transaction card may provide, to user device UD2, instructions to cause user device UD1 to activate the location detection mode. For example, the instructions may identify user device UD1, may identify a user and/or an account associated with user device UD1, may identify the transaction card from which the instructions originated, may include a set of credentials (e.g., a username/password combination, a security token, etc.) associated with accessing user device UD1, may identify a network provider associated with user device UD1, and/or the like. In this way, the set of instructions can provide verification to user device UD2 and/or to the server device that the transaction card has permission to cause user device UD1 to activate the location detection mode, can facilitate communication of the instructions to the appropriate server device (e.g., of the network provider associated with user device UD1), and/or the like. In some implementations, the set of instructions and/or the information included in the set of instruction may be stored in memory resources of the transaction card prior to being provided to user device UD2.

As shown by reference number 125, user device UD2 may provide the instructions to the server device. In some implementations, user device UD2 may include additional information in the instructions prior to providing the instructions.

For example, user device UD2 may include information confirming that an owner of user device UD2 has opted in to user device UD2 being used in this manner.

In some implementations, communications between the various devices shown in FIG. 1 may be limited to providing a set of instructions to cause the various devices to operate in the manner described herein. For example, the communications may not be read and/or write communications (e.g., user device UD2 cannot read data stored on user device UD1 and/or write data to user device UD1). Rather, the communications may be limited to a transmission of instructions to cause user device UD1 to activate the location detection mode. This reduces or eliminates security risks (e.g., invasions of privacy, hacking, transmission of malicious code, etc.) that would be present if user device UD2 could communicate with user device UD1 in an unrestricted manner, particularly when the owners of user device UD1 and UD2 do not know each other.

In some implementations, user device UD2 may cause a notification to be provided for display via user device UD2 to confirm that the instructions are to be provided to the server device prior to providing the instructions to the server device. In some implementations, if the user of user device UD2 confirms that the instructions are to be provided to the server device via a user interface associated with the notification, then user device UD2 may provide the instructions to the server device. Conversely, if the user of user device UD2 denies permission to use user device UD2 to provide the instructions to the server device via the user interface, user device UD2 may notify the transaction card and the transaction card may select another user device (e.g., user device UD3 or user device UD4) via which to provide the instructions.

This increases a security of user device UD2 by providing a user of user device UD2 with control over whether user device UD2 is to be used to provide the instructions to the server device. In addition, this conserves processing resources of user device UD2 that would otherwise be consumed providing the instructions to the server device.

As shown by reference number 130, the server device may provide the instructions to user device UD1. For example, the server device may provide the instructions via a network, such as a cellular network, the Internet, and/or the like. In this way, the server device may provide the instructions via longer-range communications. In some implementations, the server device may process a data structure that includes information identifying user devices connected to the network to determine whether user device UD1 is connected to the network (e.g., prior to providing the instructions to user device UD1). This conserves processing resources of the server device that would otherwise be consumed attempting to provide the instructions to user device UD1 if user device UD1 is not connected to a network and capable of receiving the set of instructions.

In some implementations, if the server device determines that user device UD1 is not connected to a network and is therefore not capable of receiving the instructions over longer-range communications, then the server device may send instructions to other user devices to request an indication as to whether any of the other user devices are in communicative proximity of user device UD1. For example, if user device UD1 is in a particular portion of a building, user device UD1 may not be capable of connecting to a network (e.g., a cellular network or the Internet), but may be capable of connecting to another user device, which is in a different portion of the building and is connected to the network, via a Bluetooth connection or another shorter-range wireless connection. In this case, the server device may provide the instructions to a user device connected to the same network as the server device, and the user device may provide the instructions to the user device UD1 via a shorter-range wireless connection.

In some implementations, the server device may identify user devices that could be within communicative proximity of user device UD1 based on a last known location of user device UD1 and a location of the user devices. For example, when user device UD1 was connected to a network, the server device and/or another device associated with the network may have monitored location information for user device UD1 and the server device may use the location information to identify a last known location of user device UD1. In this case, the server device may identify one or more user devices in the same location as the last known location for user device UD1, within a threshold distance of the last known location, and/or the like (e.g., using a data structure that includes information identifying other user devices and corresponding locations of the other user devices).

In some implementations, the server device may provide a set of instructions to the other user devices to monitor for a signal from user device UD1 (e.g., a Bluetooth signal, a signal associated with a particular application installed on user device UD1, etc.). Additionally, or alternatively, if user device UD1 and any of the other user devices have a particular application installed, the user devices may be capable of automatically detecting a signal from user device UD1 associated with the application (e.g., a signal that identifies user device UD1), and the server device may request information from the other user devices as to whether the other user devices have detected that signal.

In some implementations, if one of the other user devices has detected user device UD1, then the server device may select one of the other user devices (e.g., based on which user device has the best connection with user device UD1) and may provide the instructions to user device UD1 via the selected user device. For example, the server device may select a user device of the other user devices in a manner similar to that described elsewhere herein. In this way, the server device can provide the instructions to user device UD1 when user device UD1 is disconnected from a network. This improves a capability of the server device to provide instructions to user device UD1.

As shown by reference number 135, user device UD1 may activate the location detection mode after receiving the instructions from the server device (or from another user device). In some implementations, based on activating the location detection mode, user device UD1 may output one or more sensory outputs. For example, user device UD1 may output a sound (e.g., a ringtone, a voice notification, etc.) via a speaker associated with user device UD1, may activate a light, or a pattern of lights, associated with user device UD1, may activate a vibration motor associated with user device UD1, and/or the like. Additionally, or alternatively, user device UD1 may activate a GPS component (if not already activated) associated with user device UD1 and may gather location information that identifies a location of user device UD1 (e.g., a set of coordinates, geolocation information, etc.), may cause the GPS component to gather the location information at a higher or lower rate than normal (e.g., based on whether user device UD1 is moving, a battery level of user device UD1, etc.), and/or the like. In some implementations, the transaction card may output sensory output based on user device UD1 having been located (e.g., based on sending instructions to user device UD1 to activate the location detection mode). Additionally, or alternatively, the transaction card may record an amount of time from when the instructions were sent to when the transaction card is re-paired with user device UD1 (e.g., based on initiating a timer and monitoring for a signal from user device UD1, based on input via the transaction that indicates user device UD1 has been located, etc.).

In some implementations, if the GPS component cannot gather the location information, such as when user device UD1 is in a building, but user device UD1 is connected to another user device that can gather location information, user device UD1 may determine to use location information gathered by the other user device as proxy location information for user device UD1. For example, user device UD1 may provide a set of instructions to another user device to cause the other user device to gather location information, to provide the location information to the server device, and/or the like. This improves detection of a location of user device UD1 in situations where user device UD1 cannot use a GPS component to gather location information.

In some implementations, in association with activating the location detection mode, the instructions may cause a user interface to be provided for display via a display associated with user device UD1. For example, the user interface may include a notification indicating that an individual is trying to locate user device UD1, may include a set of user interface elements (e.g., text boxes, buttons, etc.), so that an individual that recovers user device UD1 can indicate that user device UD1 has been recovered, can input the information, such as the individual's name and phone number so that the owner of user device UD1 can contact the individual that recovered user device UD1, and/or the like.

As shown by reference number 140, user device UD1 may provide location information to the server device (e.g., location information gathered by a GPS component of user device UD1). For example, user device UD1 may provide the location information according to a schedule, periodically, based on the server device requesting the location information, and/or the like. Additionally, or alternatively, and as another example, user device UD1 may gather location information in a log and may provide the location information when user device UD1 has re-connected to a network. Additionally, or alternatively, and as another example, user device UD1 may provide the location information to the server device via another user device, such as when user device UD1 is connected to the other user device but is not connected to the server device (e.g., is not connected to the same network as the server device). In this case, the other user device may provide the location information from user device UD1 to the server device. Additionally, or alternatively, and as another example, user device UD1 may provide an instruction to another user device to cause the other user device to provide location information gathered by a GPS component of the other user device to the server device (e.g., to be used as proxy location information for user device UD1).

The server device may perform various actions to facilitate locating user device UD1 after receiving the location information. As shown by reference numbers 145 through 155, the server device may provide the location information to various devices (e.g., for display). In some implementations, the server device may provide the location information to a navigation application installed on another user device (e.g., user device UD5), so that the navigation application can determine a set of directions to user device UD1. For example, the other user device may be associated with the same owner, account, and/or the like as user device UD1, may be associated with an emergency contact of the owner of user device UD1, and/or the like.

Additionally, or alternatively, the server device may provide a message, such as an email or a text message, for display via another user device. For example, the message may include information identifying a location of user device UD1, whether an individual has recovered user device UD1, and/or the like. Additionally, or alternatively, the server device may cause another device (e.g., another user device or the transaction card) to output sensory output indicating that user device UD1 was recovered.

Additionally, or alternatively, the server device may record metrics related to an amount of time to determine a location of user device UD1, to recover user device UD1, and/or the like and may perform analytics on the metrics. Additionally, or alternatively, the server device may provide a set of instructions to power down user device UD1 and/or to deactivate the location detection mode (e.g., after receiving an indication that user device UD1 was recovered by the owner of user device UD1 or another individual, after receiving an indication that an owner of user device UD1 is on the way to recover user device UD1, etc.). Additionally, or alternatively, the server device may monitor a location of user device UD1 (e.g., as an individual moves user device UD1), and may provide information identifying the location of user device UD1 for display on a digital map provided for display via another user device.

In this way, a transaction card may be capable of facilitating location of a user device (e.g., a lost, stolen, or misplaced user device), particularly when the transaction card and the user device are out of pairing range of each other. This improves identifying the location of the user device by reducing or eliminating a need for the transaction card and the user device to be within communicative proximity of each other for the transaction card to facilitate identifying the location of the user device. For example, this facilitates location of a user device (e.g., user device UD1) in a situation where a user of the transaction card (and the user device) does not have another user device that can be used to locate user device UD1, such as when the user of the transaction card loses the user device while completing errands alone, while commuting to work, and/or the like. In addition, this increases an accuracy of locating the user device via use of location information gathered by a GPS component of the user device (e.g., relative to approximating a location of the user device based on whether the user device is within communicative proximity of the transaction card). Further, this reduces an amount of time needed to locate a user device, thereby increasing an efficiency of locating the user device.

As indicated above, FIG. 1 is provided merely as an example. Other examples are possible and may differ from what was described with regard to FIG. 1. Although some implementations described with regard to FIG. 1 were described as being performed by particular devices, the implementations can be performed by any of the devices of FIG. 1. In addition, although some implementations were described in the context of locating a lost, stolen, misplaced, and/or the like device for explanatory purposes, the implementations are not limited to locating a device in those situations. Further, although some implementations were described in the context of locating a device that is outside of communicative proximity of another device, the implementations are not limited to this situation and can apply to locating a device that is within communicative proximity of another device. Further, although the implementations were described in the context of using a transaction card to locate a user device, the implementations apply equally to using a transaction card to locate another transaction card, to using a user device to locate a transaction card (e.g., as described with regard to FIG. 5), to using a user device to locate another user device, and/or the like.

Figure 2:
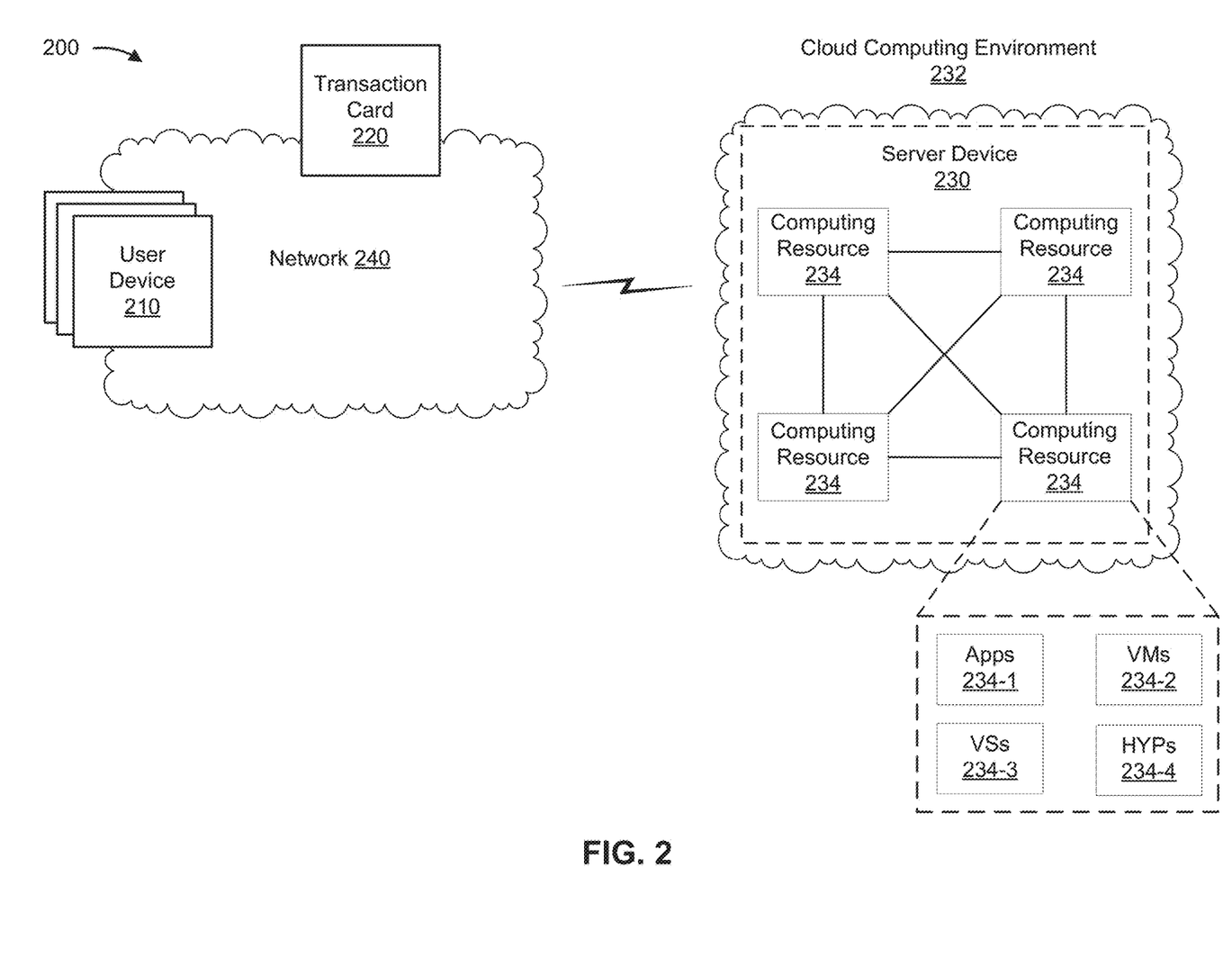
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of user devices 210 (e.g., referred to collectively as "user devices 210," and individually as "user device 210"), a transaction card 220, a server device 230 in a cloud computing environment 232 that includes a set of computing resources 234, and a network 240. Devices of environment 200 may interconnect via wired connections, wireless connections, or a combination of wired and wireless connections.

User device 210 includes one or more devices capable of receiving, generating, storing, processing, and/or providing information associated with causing a device to activate a location detection mode. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, user device 210 may select another user device 210 via which to cause transaction card 220 to activate a location detection mode associated with transaction card 220, as described elsewhere herein. Additionally, or alternatively, user device 210 may activate a location detection mode associated with user device 210 based on an instruction from transaction card 220, as described elsewhere herein.

Transaction card 220 includes a transaction card that can be used to complete a transaction. For example, transaction card 220 may include a credit card, a debit card, a gift card, a payment card, an automated teller machine (ATM) card, a stored-value card, a fleet card, a transit card, an access card, a virtual card implemented on user device 210, and/or the like. Transaction card 220 may be capable of storing and/or communicating data for a point-of-sale (PoS) transaction with a transaction terminal. For example, transaction card 220 may store and/or communicate data, including account information (e.g., an account identifier, a cardholder identifier, etc.), expiration information of transaction card 220 (e.g., information identifying an expiration month and/or year of transaction card 220), banking information (e.g., a routing number of a bank, a bank identifier, etc.), transaction information (e.g., a payment token), and/or the like. For example, to store and/or communicate the data, transaction card 220 may include a magnetic strip and/or an integrated circuit (IC) chip (e.g., a EUROPAY®, MASTERCARD®, VISA® (EMV) chip). In some implementations, transaction card 220 may select a first user device 210 via which to cause a second user device 210 to activate a location detection mode of the second user device 210, as described elsewhere herein.

Transaction card 220 may include an antenna to communicate data associated with transaction card 220. The antenna may be a passive radio frequency (RF) antenna, an active RF antenna, and/or a battery-assisted RF antenna. In some implementations, transaction card 220 may be a smart transaction card, capable of communicating wirelessly (e.g., via Bluetooth, Bluetooth Low Energy (BLE), near-field communication (NFC), and/or the like) with a computing device, such as user device 210, a digital wallet, and/or another device. In some implementations, transaction card 220 may communicate with a transaction terminal to complete a transaction (e.g., based on being moved within communicative proximity of the transaction terminal), as described elsewhere herein.

Server device 230 includes one or more devices capable of receiving, generating, storing, processing, and/or providing information associated with activating a location detection mode of transaction card 220 and/or user device 210. For example, server device 230 may include a server (e.g., in a data center or a cloud computing environment), a data center (e.g., a multi-server micro data center), a workstation computer, a virtual machine (VM) provided in a cloud computing environment, or a similar type of device. In some implementations, server device 230 may provide, to user device 210 and/or transaction card 220, an instruction to activate a location detection mode of transaction card 220 and/or user device 210, as described elsewhere herein. Additionally, or alternatively, server device 230 may select a device (e.g., user device 210) via which to provide the instruction, as described elsewhere herein. In some implementations, server device 230 may be a physical device implemented within a housing, such as a chassis. In some implementations, server device 230 may be a virtual device implemented by one or more computer devices of a cloud computing environment or a data center.

In some implementations, as shown in FIG. 2, server device 230 may be hosted in cloud computing environment 232. Notably, while implementations described herein describe server device 230 as being hosted in cloud computing environment 232, in some implementations, server device 230 may not be cloud-based (i.e., may be implemented outside of a cloud computing environment) or may be partially cloud-based.

Cloud computing environment 232 includes an environment that hosts server device 230. Cloud computing environment 232 may provide computation, software, data access, storage, and/or other services that do not require end-user knowledge of a physical location and configuration of a system and/or a device that hosts server device 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host server device 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with server device 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
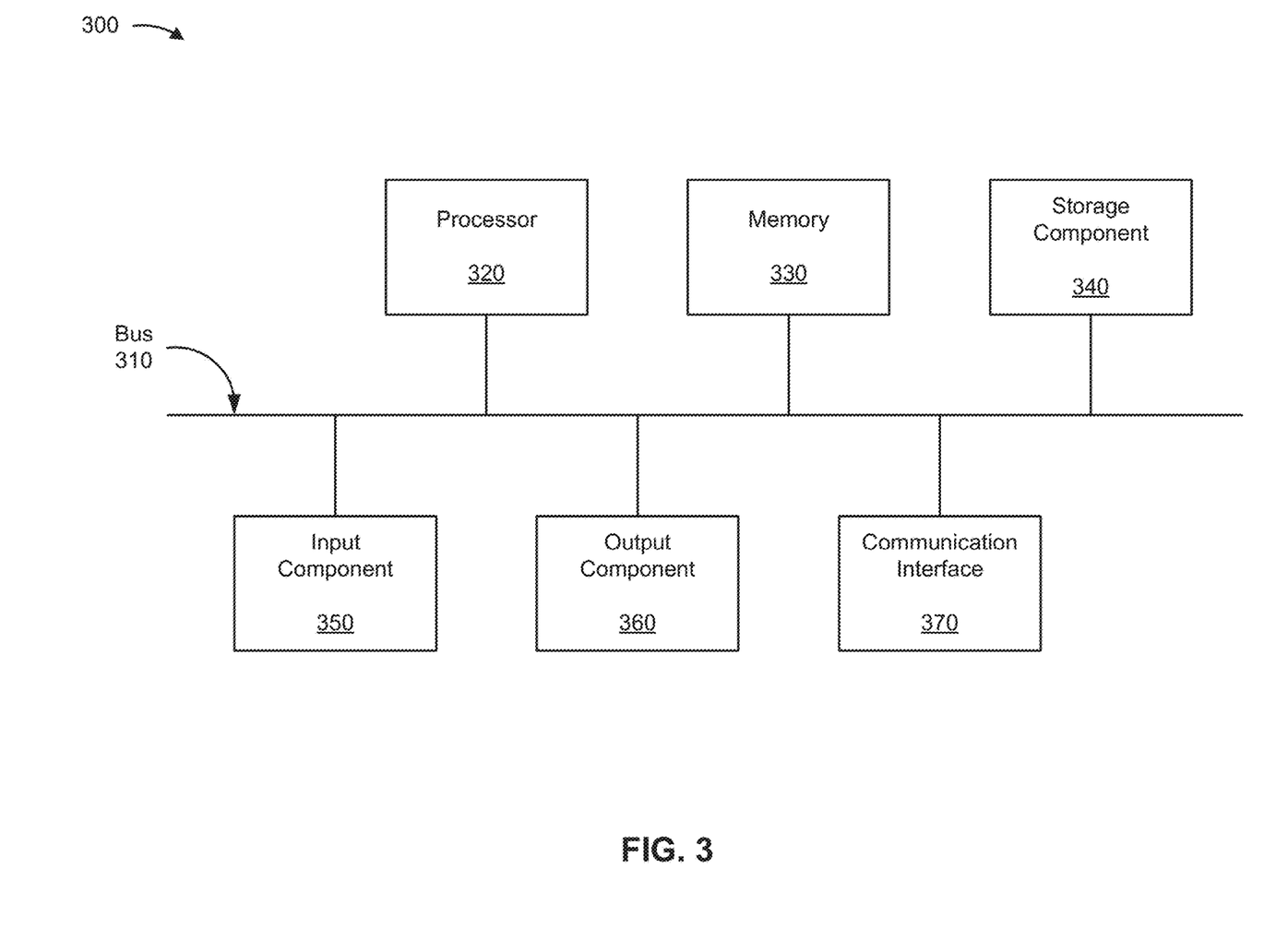
FIG. 3 is a diagram of example components of one or more devices of FIG. 2.

FIG. 3 is a diagram of example components of a device 300. Device 300 may correspond to user device 210, transaction card 220, server device 230, and/or computing resource 234. In some implementations, user device 210, transaction card 220, server device 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
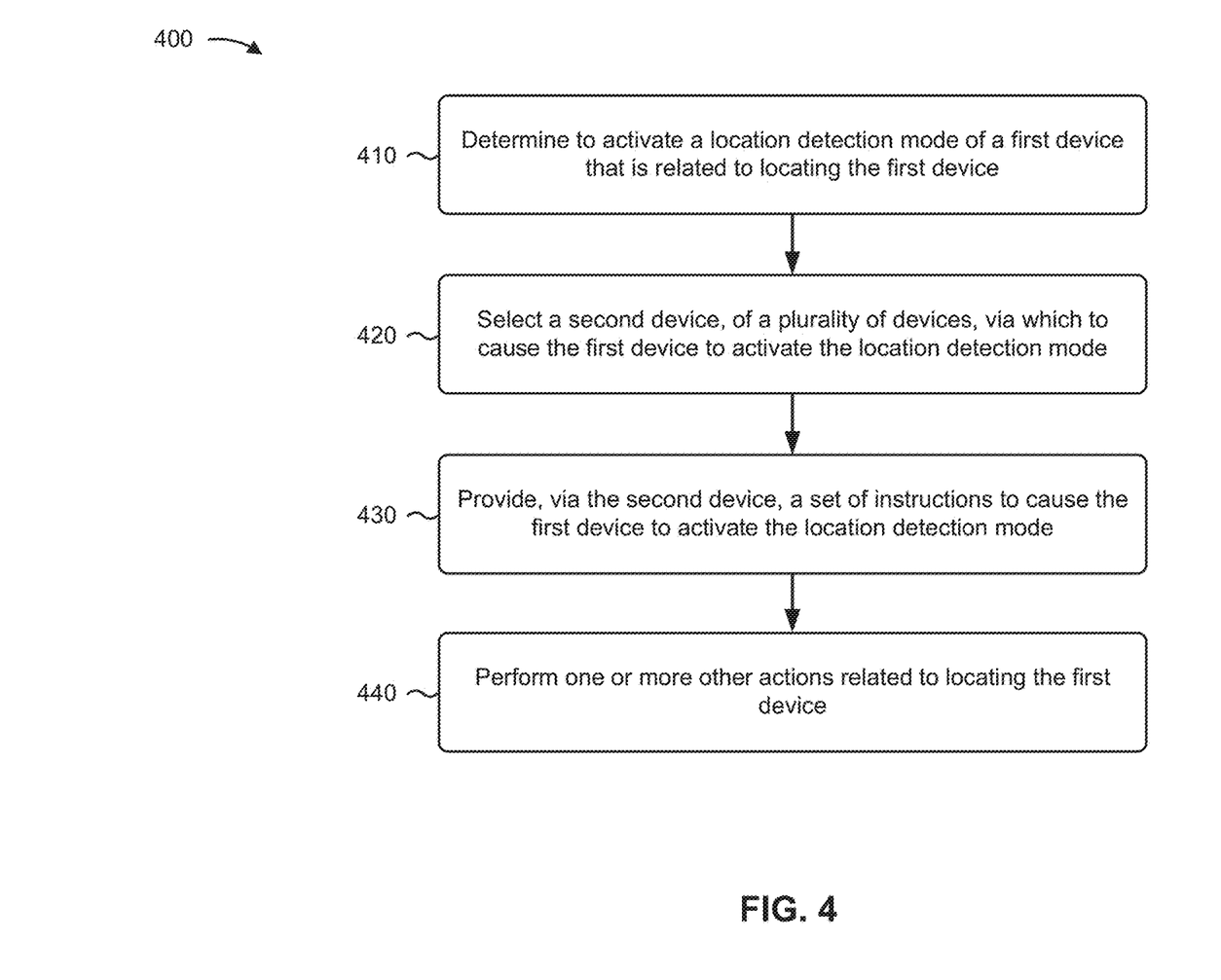
FIG. 4 is a flow chart of an example process for dynamic selection of a device from a community of devices as a conduit for location detection mode activation.

FIG. 4 is a flow chart of an example process 400 for dynamic selection of a device from a community of devices as a conduit for location detection mode activation. In some implementations, one or more process blocks of FIG. 4 may be performed by a device (e.g., a transaction card, such as transaction card 220, or a server device, such as server device 230). In some implementations, one or more process blocks of FIG. 4 may be performed by another device or a group of devices separate from or including the device, such as a user device (e.g., user device 210) and/or a computing resource (e.g., computing resource 234).

As shown in FIG. 4, process 400 may include determining to activate a location detection mode of a first device that is related to locating the first device (block 410). For example, the device (e.g., using processor 320, input component 350, and/or the like) may determine to activate a location detection mode of a first device (e.g., the user device, the transaction card, etc.) that is related to locating the first device, such as where the first device is not within communicative proximity (e.g., a short-range direct communication, a Bluetooth communication, an NFC communication, etc.) of a wireless transceiver component of an associated device of the first device (e.g., the transaction card when the first device is the user device, or the user device when the first device is the transaction card).

As further shown in FIG. 4, process 400 may include selecting a second device, of a plurality of devices, via which to cause the first device to activate the location detection mode (block 420). For example, the device (e.g., using processor 320) may select a second device (e.g., a user device), of a plurality of devices (e.g., a plurality of user devices), via which to cause the first device to activate the location detection mode, such as after identifying the plurality of devices (e.g., where the plurality of devices is within communicative proximity of the wireless transceiver component of the associated device).

As further shown in FIG. 4, process 400 may include providing, via the second device, a set of instructions to cause the first device to activate the location detection mode (block 430). For example, the device (e.g., using processor 320, communication interface 370, and/or the like) may provide, via the second device, a set of instructions to cause the first device to activate the location detection mode.

As further shown in FIG. 4, process 400 may include performing one or more other actions related to locating the first device (block 440). For example, the device (e.g., using processor 320, output component 360, communication interface 370, and/or the like) may perform one or more other actions related to locating the first device.

Process 400 may include additional implementations, such as any single implementation or any combination of implementations described below.

In some implementations, the transaction card may detect selection of an input component associated with the transaction card and may determine to activate the location detection mode after detecting selection of the input component. In some implementations, the transaction card may determine that the transaction card and the first device are no longer paired (e.g., by communicating with the user device, by receiving a communication from the user device, based on being unpaired from the user device for a threshold amount of time, etc.) and may determine to activate the location detection mode after determining that the transaction card and the first device are no longer paired. In some implementations, the server device may determine to activate the location detection mode based on at least one of: input from another device (e.g., the associated device), or an indication that the first device and the associated device are no longer paired (e.g., an indication that the transaction card and the user device are no longer paired).

In some implementations, the transaction card may determine that the second device (e.g., a user device) has a closest proximity to the transaction card relative to other devices (e.g., other user devices), of the plurality of devices, and may select the second device after determining that the second device has the closest proximity (e.g., based on comparing location information from the second device and one or more other devices, based on a signal strength of a signal between the transaction card and the second device relative to a signal strength of another signal between the transaction card and another device, etc.). In some implementations, the transaction card may determine respective scores for the plurality of devices based on a set of factors related to the plurality of devices, and may select the second device based on the respective scores for the plurality of devices (e.g., where the second device has a highest respective score relative to the other devices of the plurality of devices). For example, the transaction card may determine a score based on the set of factors having a particular value, having a value within a range of values, etc. In this way, the transaction card can account for a variety of factors when selecting a device of the plurality of devices (e.g., rather than just basing selection on a single factor, such as the closest device). In some implementations, the transaction card may determine respective ranks for the plurality of devices relative to each other based on the respective scores for the plurality of devices, and may select the second device based on the respective ranks for the plurality of devices (e.g., where the second device has a highest respective rank relative to the other devices of the plurality of devices).

In some implementations, the server device may provide another set of instructions to the plurality of devices (e.g., where the other set of instructions is related to causing the plurality of devices to determine whether the plurality of devices is within communicative proximity of the first device), may determine that the plurality of devices is in communicative proximity of the first device after providing the other set of instructions, and may identify the plurality of devices after determining that the plurality of devices is within communicative proximity of the first device.

In some implementations, the server device may determine respective scores, in a manner similar to that described elsewhere herein, for the plurality of devices after identifying the plurality of devices (e.g., where the respective scores are based on one or more factors related to the plurality of devices), and may select the second device based on the respective scores for the plurality of devices. In some implementations, the one or more factors may include a proximity of the first device to the plurality of devices, a preference of a respective user of the plurality of devices, or whether the plurality of devices is identified on a list of trusted devices (e.g., trusted user devices).

In some implementations, the transaction card and/or the server device may determine that a user device (e.g., the second device) is in communicative proximity of another user device (e.g., the first device), and may select the user device after determining that the user device is in communicative proximity of the other user device. For example, the transaction card and/or the server device may determine that a user device is in communicative proximity of another user device based on a result request and response communications broadcast by the user device and/or the other user device, based on receiving information that indicates a received signal strength of a signal between the user device and the other user device, and/or the like. In some implementations, the server device may determine that a user device (e.g., the second device) is in communicative proximity of the transaction card (e.g., the first device), and may select the user device after determining that the user device is in communicative proximity of the transaction card. In some implementations, the transaction card and/or the server device may identify the plurality of devices by identifying devices that are in communicative proximity with the first device, may determine respective scores for the plurality of devices after identifying the plurality of devices, and may select the second device based on the respective scores for the plurality of devices.

In some implementations, the set of instructions may be associated with at least one of: outputting sensory output (e.g., a sound via a speaker associated with the first device, activating a light associated with the first device, activating a vibration component associated with the first device, etc.), or collecting location information that identifies a location of the first device. In some implementations, the set of instructions may be related to causing the first device to output location information that identifies a location of the first device.

In some implementations, the server device may receive, from the first device, location information that identifies a location of the first device, may determine a set of directions to the location of the first device based on the location information, and may output the set of directions after determining the set of directions. In some implementations, the server device may provide, to the first device, an instruction related to disabling the first device. In some implementations, the server device may provide, to a user device (e.g., the associated device), a notification that identifies a location of the first device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
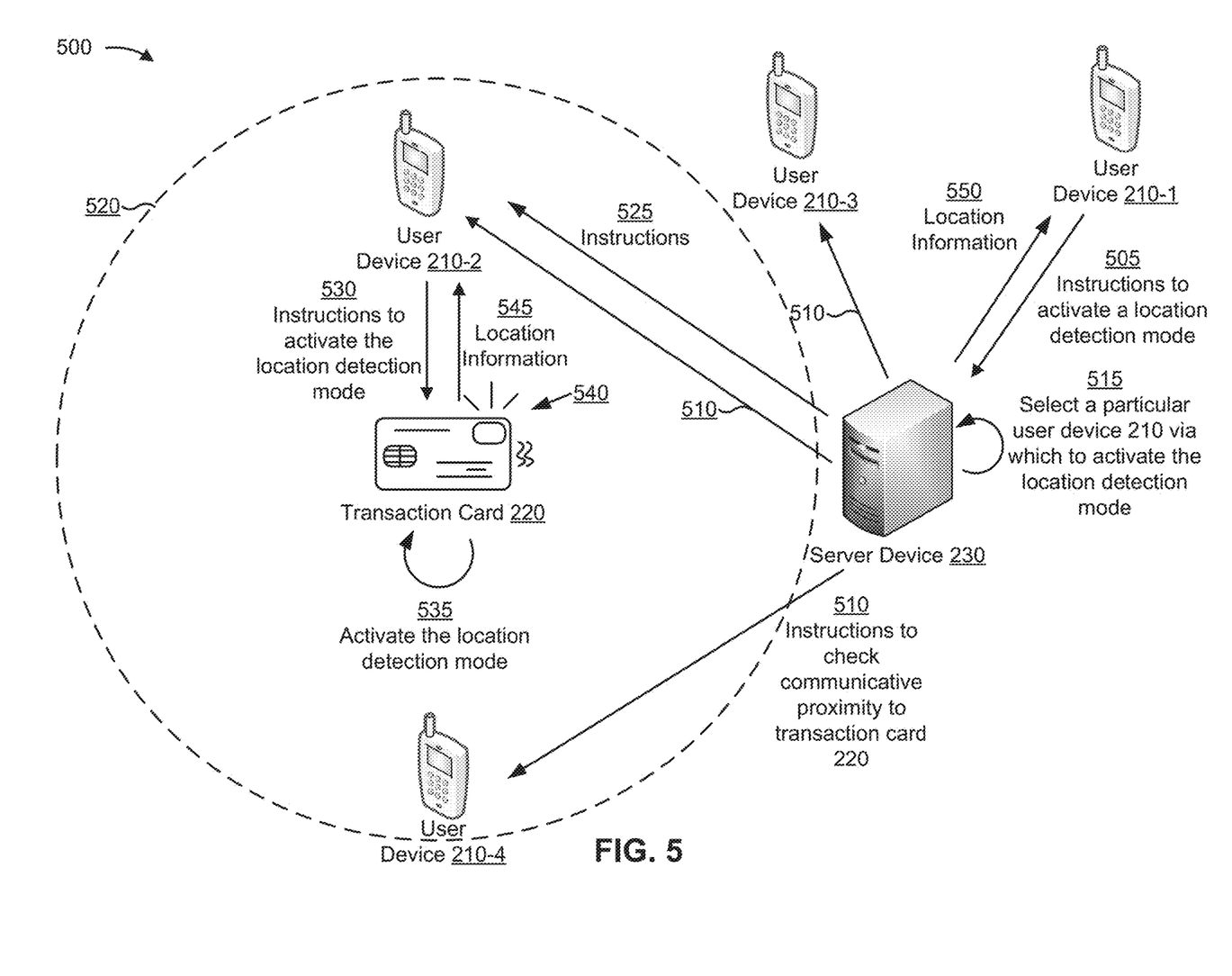
FIG. 5 is a diagram of an example implementation relating to the example process shown in FIG. 4.

FIG. 5 is a diagram of an example implementation 500 related to the example process shown in FIG. 4. FIG. 5 shows an example of using user device 210 to locate transaction card 220 (e.g., a lost, stolen, misplaced, etc. transaction card 220). As shown, implementation 500 includes multiple user devices 210 (e.g., shown as user devices 210-1 through 210-4), transaction card 220, and server device 230.

As shown in FIG. 5, and by reference number 505, user device 210-1 may provide, to server device 230, instructions to activate a location detection mode of transaction card 220. In some implementations, user device 210-1 may provide the instructions based on detecting that user device 210-1 and transaction card 220 are no longer paired. Additionally, or alternatively, user device 210-1 may provide the instructions based on user device 210-1 receiving input via a user interface provided for display via a display associated with user device 210-1. In some implementations, the instructions may identify transaction card 220, may include a set of credentials associated with transaction card 220 and/or an account associated with transaction card 220, may identify user device 210-1, may identify a user of user device 210-1, and/or the like similar to that described elsewhere herein.

As shown by reference numbers 510, after receiving the instructions from user device 210-1, server device 230 may provide instructions, to various user devices 210 (e.g., shown as user devices 210-2 through 210-4), to check a communicative proximity of the various user devices 210 to transaction card 220. For example, server device 230 may identify the various user devices 210 by identifying user devices 210 within a threshold proximity of a last known location of transaction card 220 (e.g., a last known location of when transaction card 220 and user device 210-1 were paired as determined from information from user device 210-1), by identifying user devices 210 on a trusted list of user devices 210 stored by server device 230, by identifying all user devices 210 in a particular location (e.g., a location identified by a GPS component of user device 210-1, a location identified by input via a user interface to server device 230, etc.), and/or the like.

In some implementations, based on receiving the instructions, the various user devices 210 may attempt to connect to transaction card 220 (e.g., may attempt to establish a Bluetooth connection with transaction card 220). For example, the various user devices 210 may identify transaction card 220 from information included in the instructions and may attempt to connect to transaction card 220 based on this information. Additionally, or alternatively, the various user devices 210 may monitor for information broadcast from transaction card 220 to determine whether the various user devices 210 are within communicative proximity of transaction card 220. In some implementations, each user device 210, of the various user devices 210 may provide, to server device 230, information indicating whether that user device 210 is within communicative proximity of transaction card 220.

In some implementations, if a particular user device 210 determines that the particular user device 210 is not within communicative proximity of transaction card 220, the particular user device 210 may not provide the information to server device 230, thereby conserving processing resources of the particular user device 210. Assume for FIG. 5 that user devices 210-2 and 210-4 are within communicative proximity of transaction card 220 and that user device 210-3 is not within communicative proximity of transaction card 220.

As shown by reference number 515, server device 230 may select a particular user device 210, within communicative proximity of transaction card 220 (as shown by reference number 520), via which to activate the location detection mode. For example, server device 230 may select a particular user device 210 based on one or more factors in a manner similar to that described elsewhere herein. In some implementations, the one or more factors may be similar to that described above. For example, the one or more factors may include whether a particular user device 210 is within communicative proximity to transaction card 220, is on a trusted devices list, a signal strength of a signal from transaction card 220, a proximity of a particular user device 210 to a last known location of transaction card 220, and/or the like. Assume for FIG. 5 that server device 230 selects user device 210-2.

As shown by reference number 525, server device 230 may provide, to user device 210-2, instructions to cause transaction card 220 to activate the location detection mode. As shown by reference number 530, user device 210-2 may provide the same instructions to transaction card 220 via a wireless connection between user device 210-2 and transaction card 220. As shown by reference umber 535, transaction card 220 may activate the location detection mode. For example, transaction card 220 may power on various components of transaction card 220 to activate the location detection mode, such as a GPS component, a speaker, a light, and/or the like. As shown by reference number 540, based on activating the location detection mode, transaction card 220 may output various types of sensory output, such as sound from a speaker, light from a light, vibration from a vibration motor, and/or the like.

As shown by reference number 545, transaction card 220 may provide, to user device 210-2, location information that identifies a location of transaction card 220. For example, the location information may have been gathered by a GPS component of transaction card 220, in a manner similar to that described elsewhere herein. In some implementations, after receiving the location information from transaction card 220, user device 210-2 may provide the location information to server device 230. As shown by reference number 550, server device 230 may provide, to user device 210-1 and for display, the location information. Additionally, or alternatively, server device 230 may perform one or more other actions similar to that described elsewhere herein.

As indicated above, FIG. 5 is provided merely as an example. Other examples are possible and may differ from what was described with regard to FIG. 5.

Figure 6:
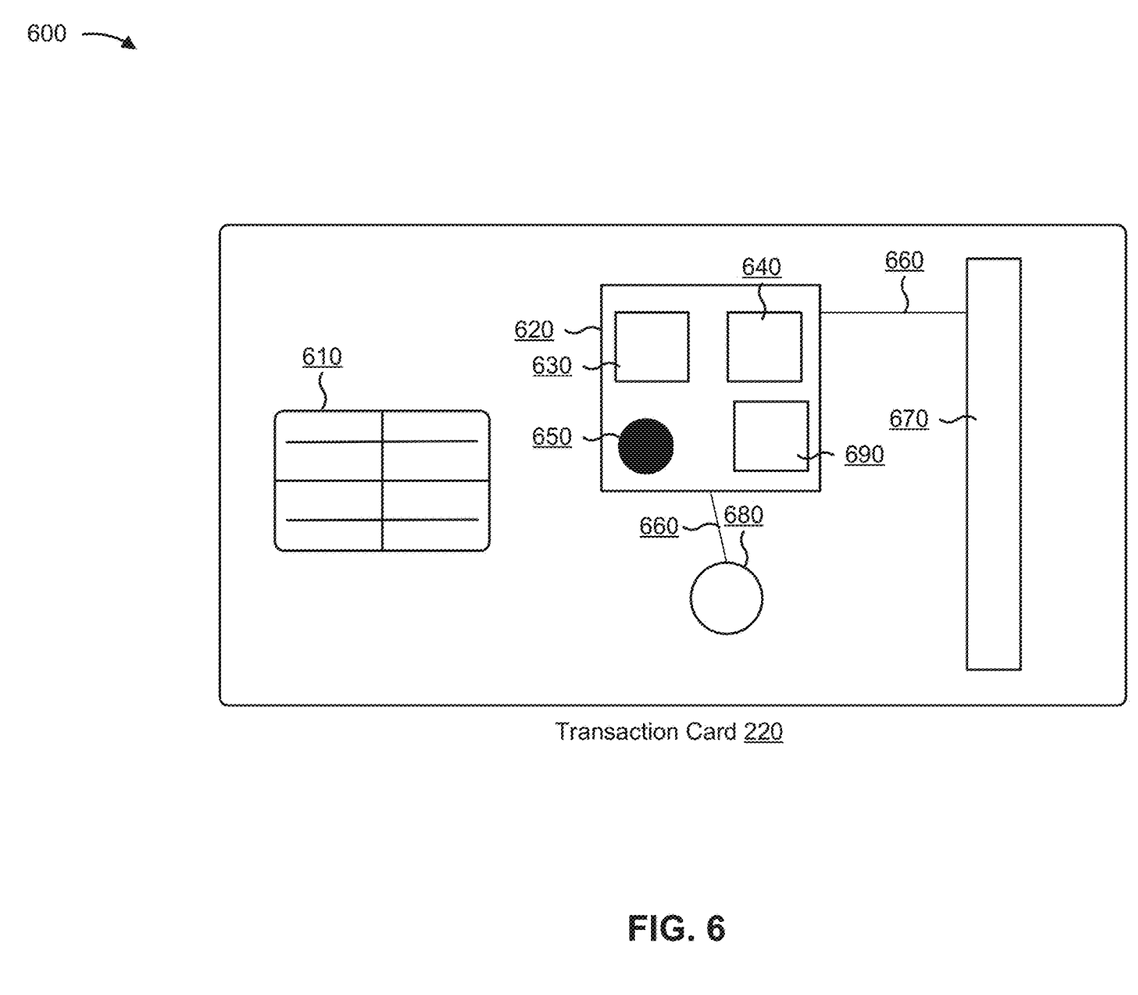
FIG. 6 is a diagram of an example implementation relating to the example process shown in FIG. 4.

FIG. 6 is a diagram of an example implementation 600 related to the example process shown in FIG. 6. FIG. 6 shows various components of transaction card 220.

As shown by reference number 610, transaction card 220 may include an EMV chip. For example, the EMV chip may store information provided to and/or from transaction card 220, as described elsewhere herein. As shown by reference number 620, transaction card 220 may include a printed circuit board (PCB), such as a motherboard, to mechanically support one or more other components of transaction card 220. As shown by reference number 630, transaction card 220 may include a GPS component. For example, the GPS component may be configured to determine location information that identifies a location of transaction card 220 when transaction card 220 is in a location detection mode.

As shown by reference number 640, transaction card 220 may include a wireless transceiver component, such as a Bluetooth transceiver component. For example, the wireless transceiver component may be configured to connect transaction card 220 to user device 210. As shown by reference number 650, transaction card 220 may include an input component, such as a button. For example, the input component may be configured to cause transaction card 220 to determine to cause user device 210 to activate a location detection mode of user device 210. As shown by reference numbers 660, transaction card 220 may include various electrical connections configured to electrically connect components of transaction card 220.

As shown by reference number 670, transaction card 220 may include a battery. For example, the battery may be configured to electrically power components of transaction card 220. As shown by reference number 680, transaction card 220 may include an output component, such as a speaker, a light, and/or the like. For example, the output component may be configured to output sensory output when transaction card 220 has activated a location detection mode associated with transaction card 220.

As shown by reference number 690, transaction card 220 may include a processor (e.g., processor 320) to perform one or more of the functions described herein. In some implementations, using the components described herein, transaction card 220 may ping user device 210 (e.g., using a processor, a wireless transceiver component, a GPS component, etc.) when paired with user device 210. For example, transaction card 220 may send location information (e.g., determined using the GPS component) to user device 210 periodically, according to a schedule, based on receiving a request from user device 210, and/or the like. In this way, when transaction card 220 and user device 210 are no longer paired, a user may be capable of accessing information via user device 210 that identifies a previous location where transaction card 220 and user device 210 were paired. This can facilitate location of a lost transaction card 220, such as by providing information that user device 210 can use to determine a set of directions to a previous paired location of user device 210 and transaction card 220 (e.g., using a navigation application). Additionally, or alternatively, user device 210 may provide a notification for display that indicates transaction card 220 and user device 210 are no longer paired and the notification may include the location information received from transaction card 220.

As indicated above, FIG. 6 is provided merely as an example. Other examples are possible and may differ from what was described with regard to FIG. 6.

Although some implementations were described in the context of locating a lost, stolen, misplaced, and/or the like device for explanatory purposes, the implementations are not limited to locating a device in those situations. Further, although some implementations were described in the context of locating a device that is outside of communicative proximity of another device, the implementations are not limited to this situation and can apply to locating a device that is within communicative proximity of another device.

In this way, a first device may select, from a community of devices, a second device via which to configure a location detection mode of a third device when the first device and the third device are not within communicative proximity of each other. This improves detecting a location of the third device by reducing or eliminating a need for the first device and the third device to be within communicative proximity of each other. In addition, this conserves processing resources that would otherwise be consumed via a less efficient location of the third device. Further, this reduces or eliminates a cost associated with a lost, stolen, misplaced, and/or the like third device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A transaction card, comprising:
   a global positioning system (GPS) component,
     where the GPS component is configured to determine location information that identifies a location of the transaction card when the transaction card is in a location detection mode;
   a wireless transceiver component,
     where the wireless transceiver component is configured to connect the transaction card to a user device; and
   an input component,
     where the transaction card is associated with multiple user devices,
     where the multiple user devices include the user device, and
     where the input component is configured to:
       identify the user device, of the multiple user devices, based on information associated with the user device, and
       cause, based on identifying the user device, the transaction card to communicate with the user device to activate another location detection mode of the user device.

2. The transaction card of claim 1, further comprising one or more of:
   a magnetic strip, or
   an EMV chip.

3. The transaction card of claim 1, where the input component is a button.

4. The transaction card of claim 1, further comprising:
   a battery that is configured to electrically power one or more components of the transaction card.

5. The transaction card of claim 1, further comprising:
   an output component that is configured to output a sensory output when the location detection mode is activated.

6. The transaction card of claim 1, further comprising:
   a processor configured to send the location information to the user device periodically.

7. The transaction card of claim 1, further comprising:
   a processor configured to:
   receive a request from the user device; and
   send, based on receiving the request, the location information to the user device.

8. A method comprising:
   determining, by a global positioning system (GPS) component of a transaction card, location information that identifies a location of the transaction card when the transaction card is in a location detection mode,
     where the transaction card is associated with multiple user devices;
   identifying, by the transaction card, a user device, of the multiple user devices, based on information associated with the user device; and
   causing, by an input component of the transaction card and based on identifying the user device, the transaction card to communicate with the user device to activate another location detection mode of the user device.

9. The method of claim 8, further comprising:
   powering, by a battery of the transaction card, one or more other components of the transaction card.

10. The method of claim 8, further comprising:
    outputting a sensory output when the location detection mode is activated.

11. The method of claim 10, where the sensory output includes one of:
    sound from a speaker,
    light from a light, or
    vibration from a vibration motor.

12. The method of claim 8, further comprising:
    sending the location information to the user device periodically.

13. The method of claim 8, further comprising:
    receiving a request from the user device; and
    sending, based on receiving the request, the location information to the user device.

14. A non-transitory computer-readable medium storing instructions, the instructions comprising:
    one or more instructions that, when executed by at least one processor, cause the at least one processor to:
      determine location information that identifies a location of a transaction card when the transaction card is in a location detection mode,
        where the transaction card is associated with multiple user devices;
      identify a user device, of the multiple user devices, based on information associated with the user device; and cause, based on identifying the user device, the transaction card to communicate with the user device to activate another location detection mode of the user device.

15. The non-transitory computer-readable medium of claim 14, where the information associated with the user device includes information, provided via an input component of the transaction card, that identifies that the user device, of the multiple user devices, is to have the other location mode activated.

16. The non-transitory computer-readable medium of claim 14, where the information associated with the user device includes particular information received after a user selects, via a user interface of a different user device, the user device from the multiple user devices, for activating the other location mode.

17. The non-transitory computer-readable medium of claim 16, where the particular information is received from a transaction terminal that is communicatively coupled to the transaction card or is directly received from the different user device when the different user device is communicatively coupled to the transaction card.

18. The non-transitory computer-readable medium of claim 14, where the information associated with the user device includes information that identifies the user device as a most recently paired user device that is no longer paired with the transaction card.

19. The non-transitory computer-readable medium of claim 14, where the information associated with the user device includes information that identifies the user device as a user device for which a connection was terminated without receiving a notification from the user device indicating that the connection is being terminated.

20. The non-transitory computer-readable medium of claim 14, where the instructions further comprise:
   one or more instructions that, when executed by the at least one processor, cause the at least one processor to:
      disable functionality for activating the other location detection mode of the user device.

* * * * *